No. 691,984. Patented Jan. 28, 1902.
J. V. TEEL.
HAND PLANTER.
(Application filed June 20, 1901.)
(No Model.)
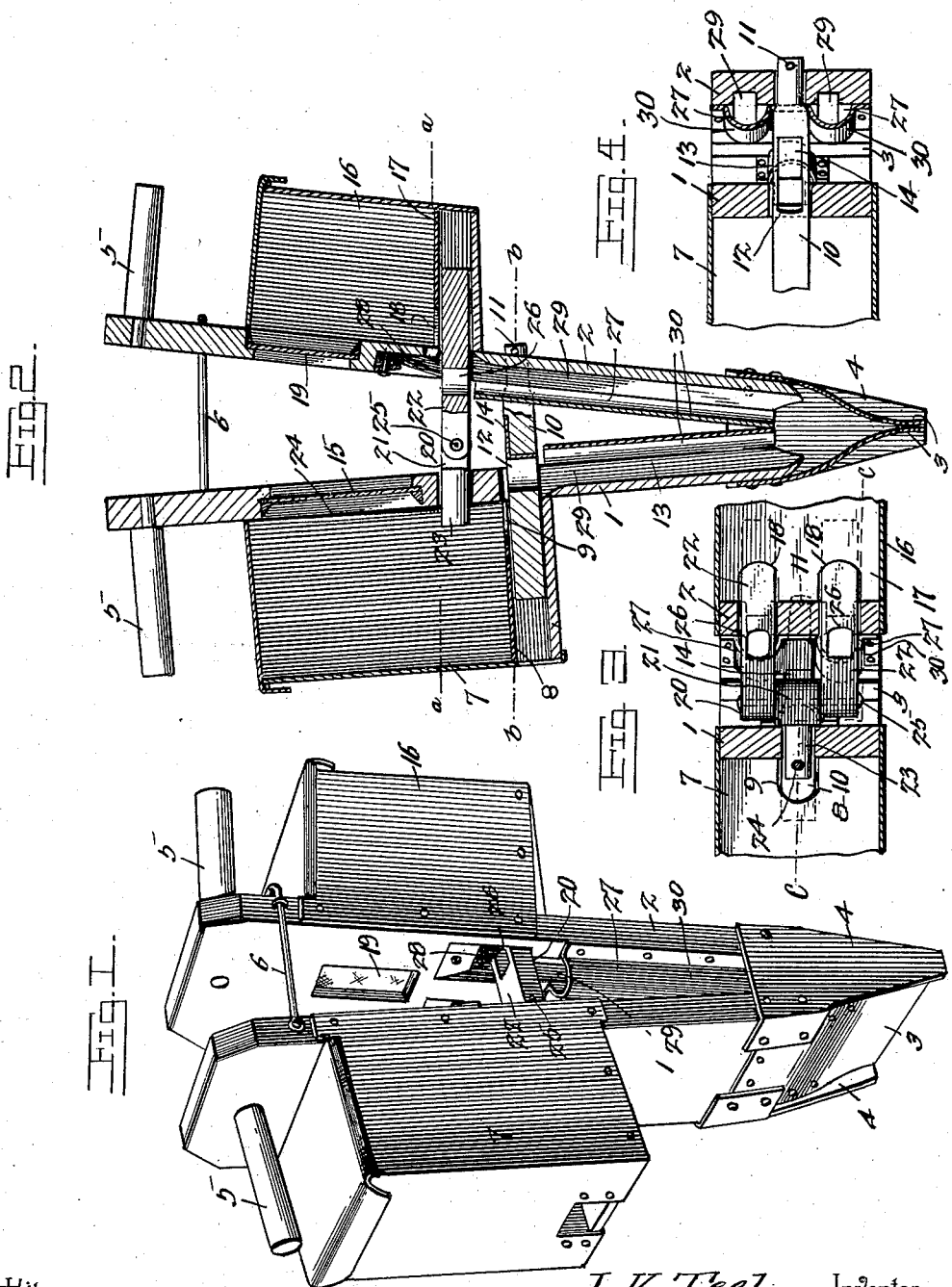
Witnesses
F. E. Alden
J. W. Garner
J. V. Teel. Inventor
by C. A. Snow & Co
Attorneys
THE NORRIS PETERS CO., PHOTO-LITHO., WASHINGTON, D. C.

UNITED STATES PATENT OFFICE.

JESSE VEACH TEEL, OF WHITESVILLE, KENTUCKY.

HAND-PLANTER.

SPECIFICATION forming part of Letters Patent No. 691,984, dated January 28, 1902.

Application filed June 20, 1901. Serial No. 65,301. (No model.)

*To all whom it may concern:*

Be it known that I, JESSE VEACH TEEL, a citizen of the United States, residing at Whitesville, in the county of Daviess and State of Kentucky, have invented a new and useful Hand-Planter, of which the following is a specification.

My invention is an improved hand-planter, especially adapted for planting corn, beans, and other seeds in hills and for also simultaneously depositing fertilizer in the hills; and it consists in the peculiar construction and combination of devices hereinafter fully set forth and claimed.
In the accompanying drawings, Figure 1 is a perspective view of a hand-planter and fertilizer-distributer constructed in accordance with my improvements. Fig. 2 is a vertical sectional view of the same. Fig. 3 is a transverse sectional view of the same, taken on a plane indicated by the line *a a* of Fig. 2. Fig. 4 is a similar view taken on a plane indicated by the line *b b* of Fig. 2.

In the embodiment of my invention I provide a pair of members 1 2, which are bars of wood. Each of the said members is provided at its lower end with a metallic jaw 3, the upper sides of the said jaws being secured on the outer sides of said members 1 2, as shown. Side plates 4 are placed on the outer edges of the said members 1 2 at the lower ends thereof and cover the same and also the outer edges of the jaws 3. The said side plates 4 are firmly secured to one of the said members 1 2 and are pivotally connected to the other of said members, so that the latter are pivotally connected together at their lower ends, and hence may be operated manually to cause the jaws 3 to open and close and the upper portions of said members 1 2 to alternately approach and recede from each other. To thus manipulate the said members, I provide the same at their upper ends with outwardly-extending handles 5. A link 6, which may be either of the form here shown or any other suitable construction, connects the upper ends of the said members together and limits the play thereof.

On the outer side of the member 1, near the upper end thereof, is a hopper 7, which is adapted to contain fertilizer. The said hopper has a false bottom 8, provided at its inner side with an opening 9. A slide 10 operates between the bottom and the false bottom of the fertilizer-hopper. The said slide has its outer end connected to the member 2, as at 11, and said slide is provided with an opening 12, which when the planter is in operation alternately registers with the opening 9 and with a fertilizer-duct 13, with which the member 1 on its inner side is provided. In the opening 12 is an adjustable plate 14, by means of which the size of the said opening may be varied to regulate the quantity of fertilizer discharged from the hopper at each operation of the planter. The member 1 has a glazed opening 15, which permits the contents of the fertilizer-hopper to be observed by the operator.

The member 2 is provided on its outer side near its upper end with a seed-hopper 16. The same has a false-bottom plate 17, provided with openings 18. Said member 2 is also provided with a glazed opening 19, by means of which the contents of the hopper 16 may be observed. The slide 20, which delivers the seeds from the hopper 16, comprises the member 21 and the members 22. The member 21 is a head having a stud 23, which projects through an opening in the member 1 and is secured therein by a pin 24. On opposite sides of the head 21 are pivoted the members 22 by a pin or bolt 25. Each of the members 22 is of the form shown and the same extend through openings in the member 2 and operate between the bottom plate and false-bottom plate of the hopper 16. Each of said members has an opening 26. Said openings 26 when the planter is operated register alternately with the openings 18 in false-bottom plate 17 and with the seed-ducts 27, with which the member 2 is provided on its inner side. Said seed-ducts 27 are spaced apart and on opposite sides of the fertilizer-duct 13. Hence the fertilizer is dropped in the hills between the seeds dropped by the members 22 of slide 20. This is advantageous, inasmuch as it admits of the corn being thinned without causing the fertilizer to be drawn out of the hills with the plants thinned or pulled out thereof. By pivotally connecting the members 22 to the member 21 said members 22 conform to the various angles of the ways or spaces between the bottom and false bottom of the hopper 16 when the planter is operated and are prevented from binding therein. I provide the member 2 with cut-off brushes 28, which bear upon the slide members 22.

It will be observed by reference to Figs. 1 and 2 of the drawings that the side plates 4 at the pivotally-connected ends of members 1 2 cover the spaces between the jaws 3 and prevent earth from working in between the said jaws when they are inserted in a hill and opened therein to deposit fertilizer and seeds in the hills.

The ducts 13 27 for the fertilizer and seeds are each formed by making a channel 29 in the wooden member 1 or 2 and covering the said channel with a semicylindrical metallic plate 30.

Having thus described my invention, I claim—

1. In a hand-planter of the class described, the combination of the members 1, 2, the jaw-plates 3 attached to the lower ends thereof and the side plates 4 forming the pivotal connections between said members, said side plates bearing on the ends of said jaw-plates and covering the space between them when said jaw-plates are open, substantially as described.

2. In a hand-planter, of the class described, the combination of the pivotally-connected members, a hopper on one of said members having discharge-openings and a slide connected to the other member to reciprocate under said discharge-openings, said slide comprising a head having a stud 25 projecting through an opening in one of the members and detachably secured in said opening, and the members 22 pivotally connected to said detachable head, substantially as described.

3. In a hand-planter of the class described, having the pivotally-connected members, means carried and operated thereby to discharge seeds and fertilizer, one of said members having the fertilizer-duct on its inner side, and the other member having a pair of seed-ducts spaced apart and opposite said fertilizer-duct, whereby the fertilizer will be deposited in the hills between the seeds, substantially as described.

In testimony that I claim the foregoing as my own I have hereto affixed my signature in the presence of two witnesses.

JESSE VEACH TEEL.

Witnesses:
I. B. WARE,
J. B. WELLS.